Patented June 12, 1928.

1,673,187

UNITED STATES PATENT OFFICE.

CHARLES EBERT, OF LEONIA, NEW JERSEY; WILLIAM B. NEWKIRK, OF RIVERSIDE, ILLINOIS; AND MEYER MOSKOWITZ, OF SPRING VALLEY, NEW YORK, ASSIGNORS TO INTERNATIONAL PATENTS DEVELOPMENT COMPANY, OF WILMINGTON, DELAWARE, A CORPORATION OF DELAWARE.

MANUFACTURE OF DEXTROSE.

No Drawing. Application filed April 1, 1927. Serial No. 180,331.

Our invention relates to the manufacture of dextrose from starch and its object is to provide a practical method of treating the "hydrol" or mother liquor separated from the solid dextrose so that it will yield additional dextrose. The advantages of the process are particularly the increased value of the yield, hydrol being by product salable only at a low price, and the decrease in the amount of equipment, crystallizers and centrifugals, which results from the augmented dextrose yield from the same quantity of raw material.

According to our present process hydrol, for example, the hydrol from pressing of slab sugars or from second or third spinning from which as much dextrose as possible has been extracted by re-crystallization (see Newkirk Patents No. 1,471,347 dated October 23, 1923 and No. 1,521,830 dated January 6, 1925) and which may have a purity—according to the usual copper sulphate test—65% to 75% dextrose (dry substance basis) and a density of from 12° to 20° Baumé is treated as follows:

(a) The hydrol for example at 16° Baumé and a temperature of approximately 170° F. is neutralized with sodium carbonate or other suitable neutralizing agent to a hydrogen ion concentration for instance of pH=7, to precipitate metallic salts, for example, of iron and copper, formed as the result of contact of the material with metal surfaces during preceding stages of the manufacture, and to coagulate and precipitate proteins, fats and colloidal matters. If the temperature of the hydrol is lower than stated the pH should be higher, that is the neutralization should be carried to a higher degree. If the hydrol temperature is higher the pH may be lower. In any case the neutralization must be carried on until coagulation and precipitation takes place. Over neutralization results in incomplete precipitation of impurities.

(b) The neutralized solution is then given a mechanical filtration to remove the flocculated and precipitated impurities which may be succeeded by an adsorption treatment with animal or vegetable carbon or equivalent substances, (such as bone char, norit, darco, nuchar, filchar, suchar).

(c) The filtered liquor is then hydrolyzed preferably in an autoclave and in the presence of a catalyzing acid. For example, the liquor at gravities up to 20° Baumé, may be heated at a pressure of 40 to 45 pounds per square inch with hydrochloric acid (commercial 28% concentration) in the proportion of 125 pounds HCl to 2500 gallons of hydrol. In any case the acid must be used in such quantity as to neutralize the alkali in the liquor and to provide sufficient excess to hydrolyze the carbohydrates to dextrose. The treatment will ordinarily be continued for 30 minutes. It is highly desirable that the conversion take place in a glass enamel lined converter or other vessel, the inner surface of which is catalytically inert in the conversion reactions. The ordinary copper converter is particularly objectionable as the copper of the vessel walls as well as the copper salts formed by action of the hydrolyzing acid thereon act as catalyzers in the manner to be referred to hereafter.

(d) If the precipitation of impurities was not complete at (a) and (b) adsorption substances such as those mentioned under (b) are introduced into the converter either before or after the conversion has commenced. The converted liquor, if the conversion is in a bronze or copper converter, may have a purity of from 86% to 91%. If converted in a glass lined converter, the purity may be as high as 96% or higher. For the batch indicated 20 pounds of nuchar or an equivalent amount of other adsorbents will be sufficient under ordinary circumstances.

(e) When conversion is complete the liquid is discharged from the converter, neutralized with sodium carbonate, for example, to the usual pH of 4.0° for dextrose conversions, or other suitable neutralizing agent depending upon the catalyzing acid used, and filtered in mechanical filters and preferably also over bone char. The purified liquor may then be evaporated and crystallized according to any preferred method, such for example as the methods of the Newkirk patents above referred to. It has been found possible to obtain in this way crystalline dextrose having purities ranging from 96% to 98%. If desired the liquor may be used for making slab sugar.

The hydrol derived from the just mentioned crystallizing operation may be neutralized again, reconverted and recrystallized, and this procedure kept up as long as commercially profitable or until the salt concentration reaches a point at which it begins to crystallize out with the sugar.

Heretofore the attempts occasionally made to reconvert hydrol for increase of yield have not met with practical success. This we believe to be due to the fact that the composition of the hydrol has not been known except in a very general way. In fact at the present time much remains to be learned of the exact chemical composition of hydrols derived from starch converted dextrose solutions. Apparently, however, the hydrol contains, in addition to dextrose, sugars of higher molecular weight than dextrose, one of these higher sugars, the disaccharide gentiobiose, having been already identified. These higher sugars are formed by condensation of the dextrose when the latter is heated in the presence of certain catalyzing agents, such for example as the protein, fats, and colloidal impurities (or their reaction products with the acid used for hydrolyzing the starch) and the mineral salts, such as iron and copper salts, which are found in all starch converted dextrose solutions made according to present manufacturing methods. As the starch is hydrolyzed to the monosaccharide dextrose, through the action of the catalyzing acid (HCl), the monosaccharide is condensed to form a disaccharide, and probably other sugars of higher molecular weight by the catalytic action of these impurities, the two processes going on progressively so that eventually one reaches a point of maximum dextrose content. Further treatment does not increase but probably decreases the amount of sugar in the solution as dextrose. The reactions however seem to be reversible. When the catalyzers which change the dextrose to the higher sugars are removed and the solution reconverted the acid hydrolyzes the polysaccharide sugars just as it will hydrolyze starch, splitting these higher sugars into the monosaccharide.

Whether the theory as above stated be correct, or correct in all details, we have discovered that by following the method of treating hydrol as above outlined, (a hydrol of 70% apparent purity resulting from conversion of 12.5° Baumé starch liquor with HCl at 45 pounds pressure to a purity of 89% to 90% and extracting dextrose by crystallization) it is possible to increase the yield of dextrose very considerably. It appears to be particularly important to eliminate and to subsequently keep out of the solution salts of the heavy metals. These salts seem to be particularly active as catalyzers in bringing about the change of dextrose into the higher sugar or sugars.

It will be understood that while it is desirable to employ in the manner described all of the expedients set forth in order to obtain as high a yield of dextrose as may be, it will be possible, though often with the result of a diminished yield or reduced purity of sugar produced, to omit certain steps indicated as optional or preferred. The nature of the hydrol in respect to the quantity and character of its impurities will also have something to do necessarily with the exact method of treatment to which it must be subjected in order to obtain a maximum yield consistent with economy of operation. Realizing that the process of our invention may be modified to meet varying conditions, we desire to be understood as covering by patent all modifications within the scope of the appended claims.

We claim:

1. Method of treating hydrol to increase its crystallizable dextrose content which comprises neutralizing the hydrol until coagulation and precipitation of impurities takes place, filtering it to remove coagulated and precipitated impurities and subjecting the filtered liquid to a hydrolyzing operation.

2. Method of treating hydrol to increase its crystallizable dextrose content which comprises neutralizing the hydrol until coagulation and precipitation of impurities takes place, filtering it to remove coagulated and precipitated impurities and heating the same with sufficient acid to hydrolyze the polysaccharides to dextrose.

3. Method of treating hydrol to increase its crystallizable dextrose content which comprises neutralizing the hydrol until coagulation and precipitation of impurities takes place, filtering it to remove coagulated and precipitated impurities and heating the same with sufficient acid to hydrolyze the polysaccharides to dextrose in a vessel the interior surfaces of which are catalytically inert in the conversion reactions.

4. Method of treating hydrol to increase its crystallizable dextrose content which comprises heating the same with an acid in a vessel the interior surfaces of which are of a material that does not catalyze dextrose to polysaccharides in the presence of an acid.

5. Method of treating hydrol to increase its crystallizable dextrose content which comprises neutralizing the hydrol until coagulation and precipitation of impurities takes place, filtering it to remove coagulated and precipitated impurities, subjecting the filtered liquid to a hydrolyzing operation, in the presence of an adsorption substance.

6. Method of treating hydrol to a solution to increase its crystallizable dextrose content which comprises neutralizing the hydrol until coagulation and precipitation of impurities takes place, filtering it to remove coagulated and precipitated impurities, heating the filtered liquor with a sufficient quantity of acid to hydrolyze the polysaccharides to dextrose in a vessel the interior surfaces of which are catalytically inert in the conversion reaction and in the presence of an adsorption substance.

7. Method of extracting dextrose from hydrol which comprises treating the hydrol with a neutralizing agent until coagulation and precipitation of impurities takes place and removing coagulated and precipitated impurities, converting the liquid with an acid, neutralizing the converted liquor, subjecting the same to mechanical and carbon filtrations and evaporating and crystallizing the dextrose in the solution.

8. Method of extracting dextrose from hydrol which comprises treating the hydrol with a neutralizing agent until coagulation and precipitation of impurities takes place and removing coagulated and precipitated impurities, converting the liquid with an acid in an enamel lined converter, neutralizing the converted liquor, subjecting the same to mechanical and carbon filtrations and evaporating and crystallizing the dextrose in the solution.

9. Method of extracting dextrose from hydrol which comprises treating the hydrol with a neutralizing agent until coagulation and precipitation of impurities takes place and removing coagulated and precipitated impurities, converting the liquid with an acid in the presence of an adsorption substance, neutralizing the converted liquor, subjecting the same to mechanical and carbon filtrations and evaporating and crystallizing the dextrose from the solution.

10. Method of extracting dextrose from hydrol which comprises treating the hydrol with a neutralizing agent until coagulation and precipitation of impurities takes place and removing coagulated and precipitated impurities, converting the liquid with an acid in an enamel lined converter and in the presence of an adsorption substance, neutralizing the converted liquor, subjecting the same to mechanical and carbon filtrations and evaporating and crystallizing the dextrose from the solution.

11. Method of treating dextrose solutions containing sugar having higher molecular weight than dextrose which comprises hydrolyzing said higher sugar after making ineffective the catalysts which brought about the formation of such sugar from the dextrose.

12. Method of treating dextrose solutions containing polysaccharides which comprises removing therefrom substances tending to catalyze dextrose to polysaccharides and heating the solution with an acid to hydrolyze the polysaccharides.

13. Method of treating hydrol to increase its crystallizable dextrose content which consists in coagulating, precipitating and removing therefrom protein, fatty and colloidal impurities together with compounds of the heavy metals and subjecting the solution thus purified to a hydrolyzing operation.

14. Method of treating hydrol to increase its crystallizable dextrose content which consists in coagulating, precipitating and removing therefrom protein, fatty and colloidal impurities together with compounds of the heavy metals and subjecting the solution thus purified to a hydrolyzing operation in a vessel the interior walls of which are catalytically inert in the conversion reactions.

15. Method of treating hydrol to increase its crystallizable dextrose content which consists in coagulating, precipitating and removing therefrom protein, fatty and colloidal impurities together with compounds of the heavy metals and subjecting the solution thus purified to a hydrolyzing operation in a vessel the interior walls of which are catalytically inert in the conversion reaction and in the presence of an adsorbent substance.

16. Method of converting the polysaccharides in a dextrose solution into dextrose which comprises subjecting the solution to a hydrolyzing operation in the absence of substances tending to polymerize the dextrose into such polysaccharides.

17. Method of converting the polysaccharides in a dextrose solution which consists in first removing from the solutions catalysts tending to polymerize the dextrose and hydrolyzing the polysaccharides under conditions preventing the formation of said catalysts.

18. Method of increasing the crystallizable dextrose content of hydrol which comprises subjecting the solution to a hydrolyzing operation free from the influence of catalyzing agents tending to polymerize the dextrose.

CHARLES EBERT.
WILLIAM B. NEWKIRK.
MEYER MOSKOWITZ.